No. 700,626.  
J. DAVIE.  
FEED WATER FILTER AND HEATER.  
(Application filed Sept. 17, 1901.)  
(No Model.)  
Patented May 20, 1902.  
4 Sheets—Sheet 1.

WITNESSES  
F. F. Teller  
F. A. Stewart

INVENTOR  
James Davie  
BY Edgar Tate  
ATTORNEYS

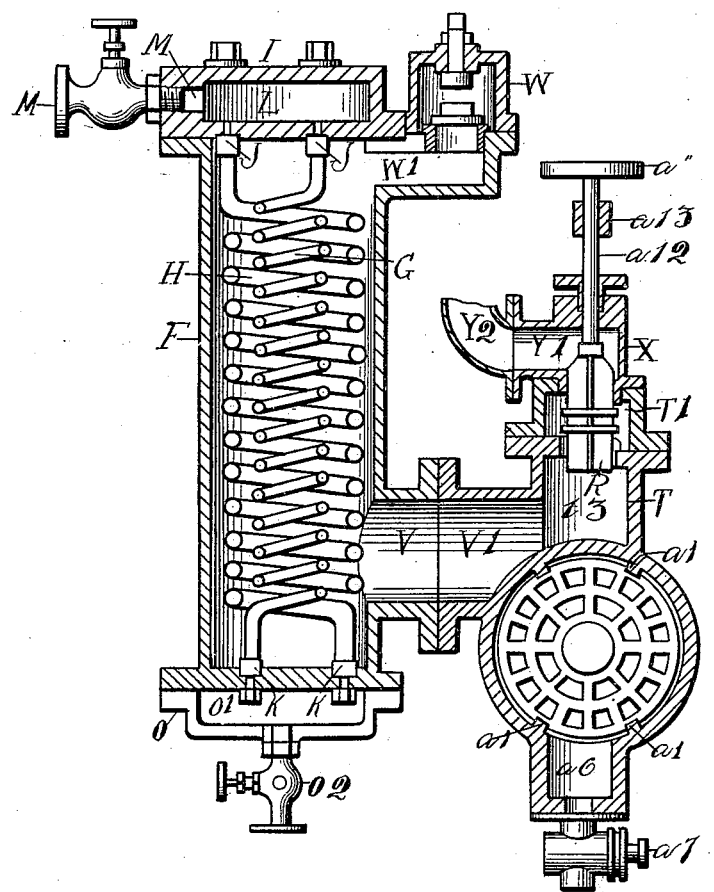

No. 700,626. Patented May 20, 1902.
J. DAVIE.
FEED WATER FILTER AND HEATER.
(Application filed Sept. 17, 1901.)
(No Model.) 4 Sheets—Sheet 3.
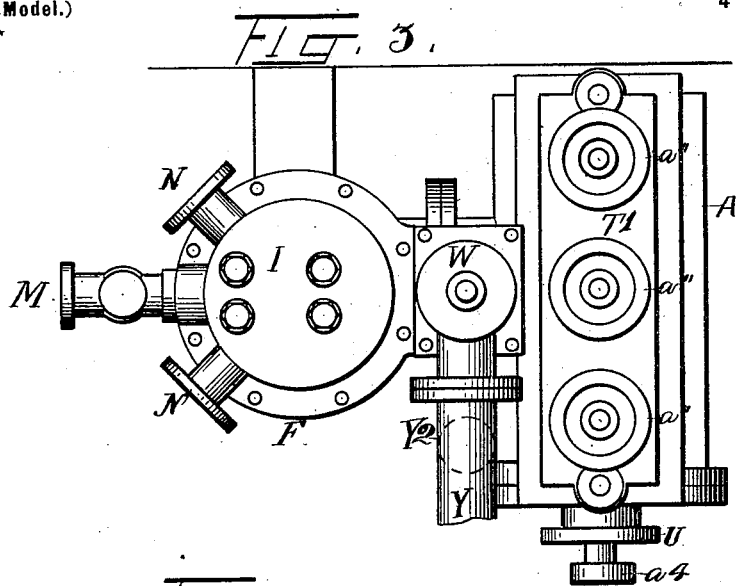
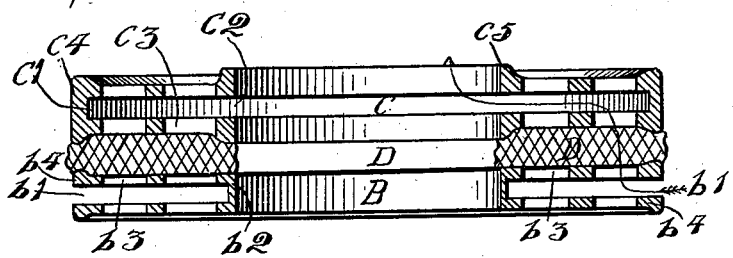
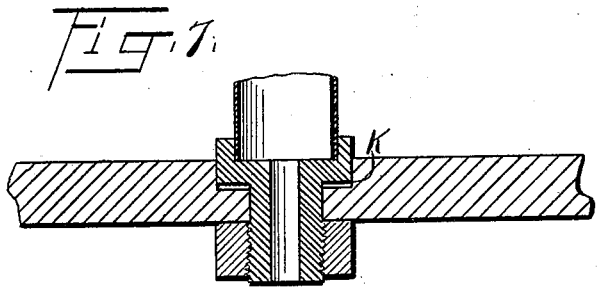

No. 700,626. Patented May 20, 1902.
J. DAVIE.
FEED WATER FILTER AND HEATER.
(Application filed Sept. 17, 1901.)
(No Model.) 4 Sheets—Sheet 4.

UNITED STATES PATENT OFFICE.

JAMES DAVIE, OF GLASGOW, SCOTLAND.

FEED-WATER FILTER AND HEATER.

SPECIFICATION forming part of Letters Patent No. 700,626, dated May 20, 1902.

Application filed September 17, 1901. Serial No. 75,717. (No model.)

*To all whom it may concern:*

Be it known that I, JAMES DAVIE, a subject of the King of Great Britain, residing at Glasgow, Scotland, have invented certain new and useful Improvements in Feed-Water Filters and Heaters, of which the following is a full and complete specification, such as will enable those skilled in the art to which it appertains to make and use the same.
This invention relates to improvements in feed-water filters and heaters, and has for its object an arrangement of parts by means of which a filter and heater are combined in a neat, efficient, and economical manner, making one whole compact apparatus, such that the water passing through it can be filtered or heated, or both or neither, as desired, and requires only one set of pipe connections to and from the apparatus.
This invention is fully disclosed in the following specification, of which the accompanying drawings form a part, in which—

Figure 1:
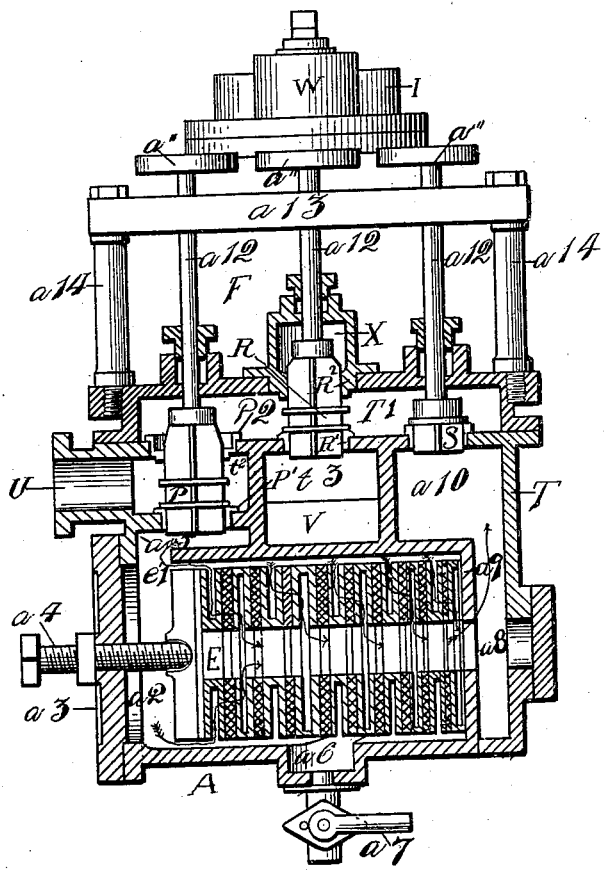
Figure 6:
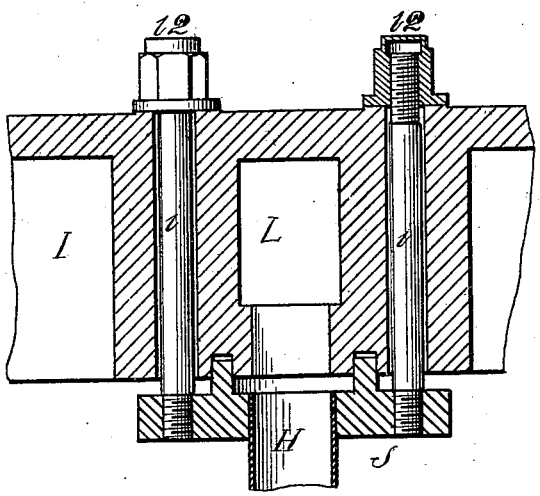
Figure 5:
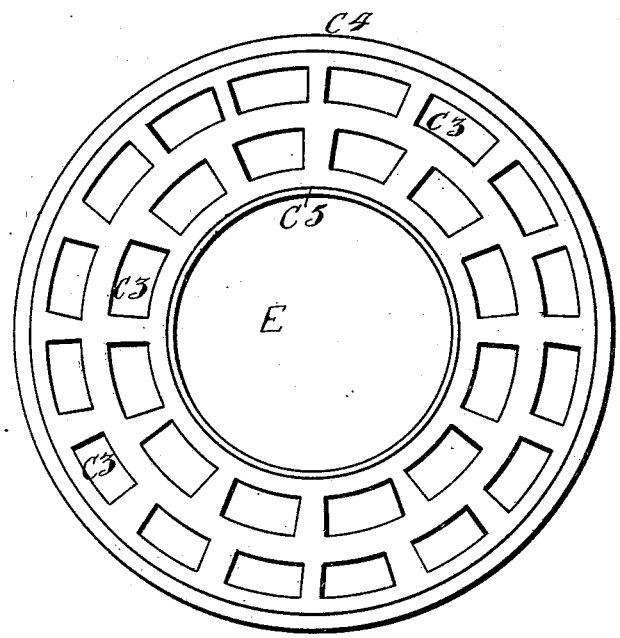

Figure 1 is a side elevation of my improved combined apparatus, showing the filter and valve-chests in section; Fig. 2 a similar view at right angles to Fig. 1, showing the filter and valve-chests in cross-section and the heater in longitudinal section; and Fig. 3 is a plan view of this combined apparatus.
Fig. 4 is an enlarged view, in sectional elevation, of my improved inlet and outlet filter-gratings with media between; and Fig. 5 is a plan view of same. Fig. 6 is an enlarged view in cross-section of my improved heater-head and method of connecting the coils to same, and Fig. 7 shows the method of connecting bottom of coils to heater.

In the drawings forming part of this specification the separate parts of my improvement are designated by letters of reference in each of the views, and in the practice of my invention, as shown in Figs. 1 to 7, inclusive, A represents the main casing of the filter, which is by preference made circular in section, but may be of any convenient form and may be placed in a horizontal, vertical, or other convenient position. On the inner periphery of the filter-casing A, I form four projections $a'$ with the object of supporting or guiding my improved filtering device, hereinafter described and which forms an annular space between the casing of the filter and the filtering device, as indicated on cross-section of the filter, as shown in Fig. 2, so that the water entering the filter can pass through the annular space into a series of inlet-gratings in the filtering device, hereinafter described, and as indicated by arrows in Fig. 1. The diameter of an inscribed circle touching the projections $a'$ is not less than the external diameter of the filtering device, so that the filtering device will pass easily inside the projections $a'$ and will fit as near the same as is found convenient, so that the projections form a support or guide to keep the filtering device in position, and the body of the filter or filtering device is formed with an opening $a^2$ at one end and of sufficient diameter to allow of the filtering device being easily placed within the projections $a'$ of the casing and withdrawn therefrom, and this opening is closed by a removable cover $a^3$, which carries the adjusting-screw $a^4$. It is also formed with an inlet-chamber $a^5$, a sediment-collector $a^6$, having a blow-off cock $a^7$ for draining the filter, an outlet $a^8$ through end of filter $a^9$, leading into an outlet-chamber $a^{10}$, valve-chests T and T', containing two double-faced valves P and R and one single-faced valve S and inlet-branch U. The valves are operated by the wheels $a^{11}$ and spindles $a^{12}$, screwed into cross-head $a^{13}$, supported on columns $a^{14}$. In combination with valve-seat $R^2$, I form a chest X with branch Y', connected by pipe $Y^2$ to main discharge Y.

The filtering device, which is an improvement on that described and claimed in my specification, Patent No. 593,740, 1897, is as shown in general arrangement in Figs. 1 and 2 and in detail in Figs. 4 and 5. It is composed of a number of pairs of inlet-gratings B and outlet-gratings C, having the filtering-media disks D, fitted between, which constitute so many separate inlets to the water to be filtered and an equal number of outlets for the water after being filtered. The inlet-gratings B are each formed of two perforated diaphragms spaced apart and are open around their outer peripheries, as at $b'$, Fig. 4, to the inlet of water to be filtered and are closed around their inner peripheries, as at $b^2$, so as to cause all the water entering therebetween to pass laterally through the perforations $b^3$ to the filtering media D. The outlet-gratings C are also each formed of two perforated diaphragms spaced apart, but are closed around their outer peripheries, as at $c'$, Figs. 4 and 5, and open around their inner peripheries, as at $c^2$, so as to discharge the filtered water through the perforations $c^3$ into the central outlet E, formed by the series of gratings and media. The cover $e'$ serves to close the end of the outlet E and acts as a rest-plate for the adjusting-screw $a^4$.

On each of the perforated diaphragms of the inlet-gratings B, I form around their outer periphery a projection $b^4$, Fig. 4, and on each of the perforated diaphragms of the outlet-gratings C, I form around their outer and inner peripheries projections $c^4$ and $c^5$, which bite the media when compressed by the screw $a^4$ and makes a tight joint between the media D and the gratings B and C at their outer and inner peripheries, and by this means I simplify the construction and operation of the device.

F represents the main body or casing of the heater, which is by preference circular in cross-section and is fitted with two or more coils G and H, placed one within the other. By preference I make the area of the bore of the tubes in the same ratio to one another as the area of their respective heating-surfaces are to one another. The coils are jointed to a chamber L, formed in the head I, by means of couplings J, secured to studs $i$, having nuts $b^2$, in the manner indicated in Fig. 6, and the coils are secured to the bottom of heater by means of hollow plugs or screws K, secured in bottom of heater, as indicated in Fig. 7. The chamber L is for the admission of steam to the coils and has an inlet-valve M for the admission of live steam from the boiler and a branch N for admitting the vapor and also a branch N' for admitting the exhaust steam from auxiliary engines when wanted for heating the feed-water. By preference I place these branches one on each side of the live-steam branch, forming an acute angle with same, as indicated in Fig. 3.

The drain from the coils is collected in a chamber $o'$, formed in bottom cover O, and is fitted with an outlet-drain valve $O^2$. The inlet to heater is by branch V jointed to valve-chest T by means of branch V', and the outlet is by a non-return valve W, which controls a passage W', communicating with the heater through a chamber $W^2$.

To form this combined apparatus, I use two double-faced valves P and R and one single-faced valve S and arrange them in a casing, which by preference is made in two parts (hereinafter referred to as "chests") T and T'. The bottom chest T is cast on filter-body A and is divided into three compartments $t^2$ $t^3$ and $a^{10}$. The top chest T' is bolted to the bottom chest T and forms a hood over valves P R and S. In the bottom chest T, I fit two valve-seats P' and $P^2$ in vertical line, one above and one below the inlet branch U. The bottom one, P', opens into the inlet-chamber $a^5$ of filter and the top one, $P^2$, into the chest T'. Between these seats I fit the double-faced valve P, such that when it is closed on seat P' it is shut to inlet-chamber $a^5$ of filter and open to chest T', and vice versa. In the bottom chest T, I fit a valve-seat R', which opens from the top chest T' into heater F by branch V, and in the top of chest T', I fit a valve-seat $R^2$, which opens to chest X, which is connected to main discharge-pipe Y by branch Y' and pipe $Y^2$. Between these seats I fit the double-faced valve R, such that when it is closed to heater it is open to chest X, and vice versa. In the bottom chest T, I fit the single-faced valve S, which communicates between the outlet-chamber $a^{10}$ and chest T'.

The mode of working this apparatus is as follows: If the valves P and S are opened to the filter, the water flows into the filter by chamber $a^5$ and by the annular space formed between the body and the filtering device passes through the filtering media, as indicated by arrows, into the top chest T', from whence it can be passed by valve R either to the boiler direct or through the heater.

By shutting the valves P and S to filter the water will pass into the top chest T', from whence it can be passed by valve R either to the boiler or into the heater, as required.

Having fully described my invention, what I claim as new, and desire to secure by Letters Patent, is—

1. A feed-water-filtering apparatus, comprising a casing having an opening at one end, a filtering device adapted to be inserted into said casing, a cover $a^3$ adapted to close said casing, a screw $a^4$ passing through said cover, an inlet-chamber $a^5$, a sediment-collector $a^6$, a blow-off $a^7$, an outlet-chamber $a^{10}$, valve-chests T, T' and X, double-faced valves P and R, a single valve S arranged in said chests and suitably-supported wheels and spindles in operative connection with said valves, substantially as shown and described.

2. A feed-water-filtering apparatus, comprising a casing having an opening at one end, a filtering device adapted to be inserted into said casing, a cover $a^3$ adapted to close said casing, a screw $a^4$ passing through said cover, an inlet-chamber $a^5$, a sediment-collector $a^6$, a blow-off $a^7$, an outlet-chamber $a^{10}$, valve-chests T, T' and X, double-faced valves P and R, a single valve S arranged in said chests and suitably-supported wheels and spindles in operative connection with said valves, said filtering device being composed of inlet-gratings B, outlet-gratings C and filter-disks D arranged in series and forming inlets to the water to be filtered, and outlets to the filtered water, substantially as shown and described.

3. In an apparatus of the class described a filter-casing, a filtering device adapted to be placed therein; valve-chests T, T' and X in said casing, double-faced valves P and R and a single-faced valve S arranged in said chests, means for operating said valves, an inlet in communication with one of said valve-chests, a heater in communication with said inlet, and an outlet also in communication with one of said valve-chests, whereby water may be heated, or filtered, or both, or neither, as desired, substantially as shown and described.

In testimony that I claim the foregoing as my invention I have signed my name, in presence of the subscribing witnesses, this 6th day of September, 1901.

JAMES DAVIE.

Witnesses:
JOHN SINCLAIR,
JAMES McMILLAN.